Feb. 16, 1971 J. H. EMORE, JR 3,562,929
ISOLATION BOOTH
Filed July 25, 1968 3 Sheets-Sheet 1
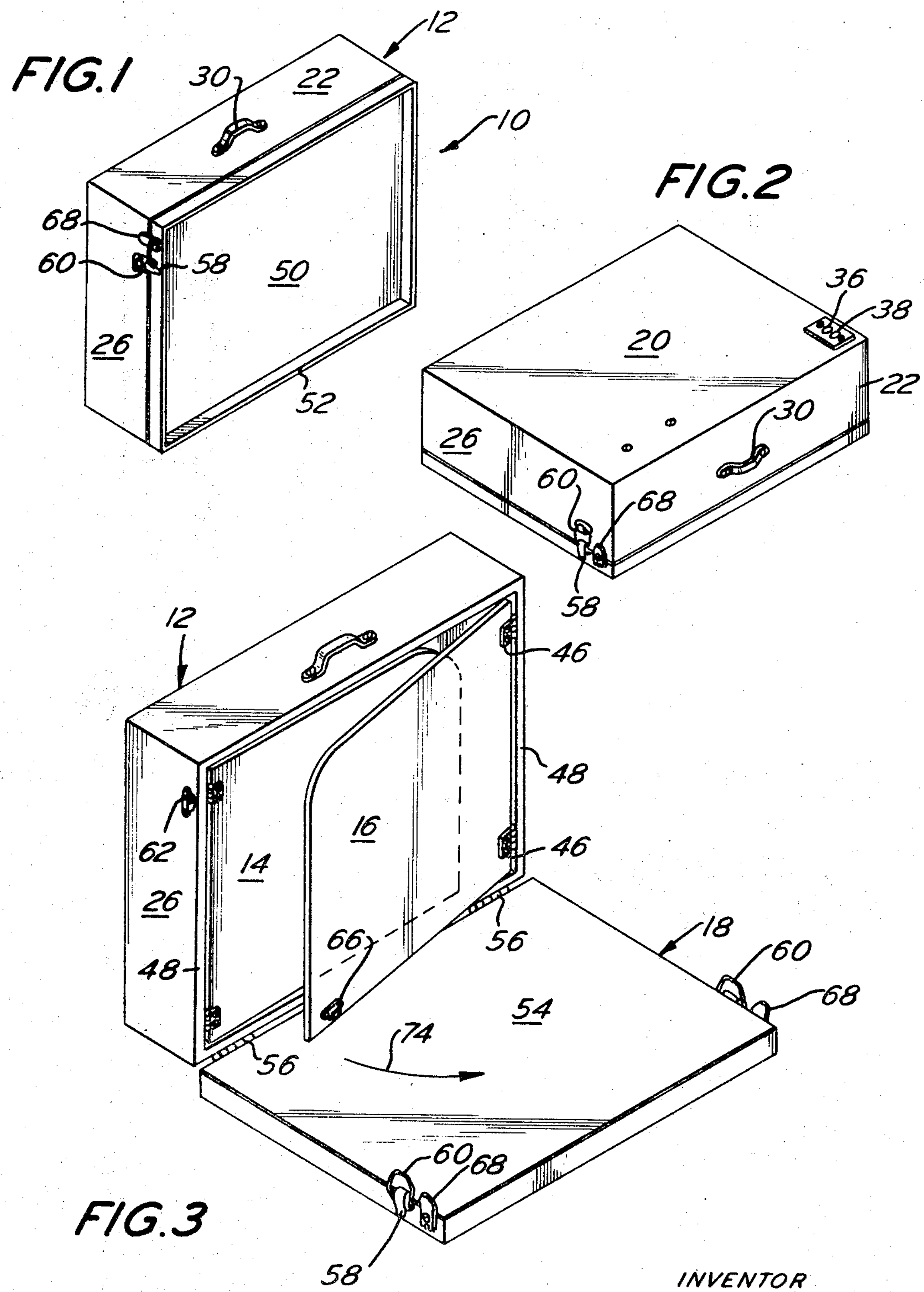
INVENTOR
JOHN H. EMORE, JR.
BY
Caesar, Rivise, Bernstein & Cohen
ATTORNEYS.

ISOLATION BOOTH

Filed July 25, 1968 3 Sheets-Sheet 2

INVENTOR
JOHN H. EMORE, JR.
BY
Caesar, Rivise, Bernstein & Cohen
ATTORNEYS.

ISOLATION BOOTH
FIG. 6
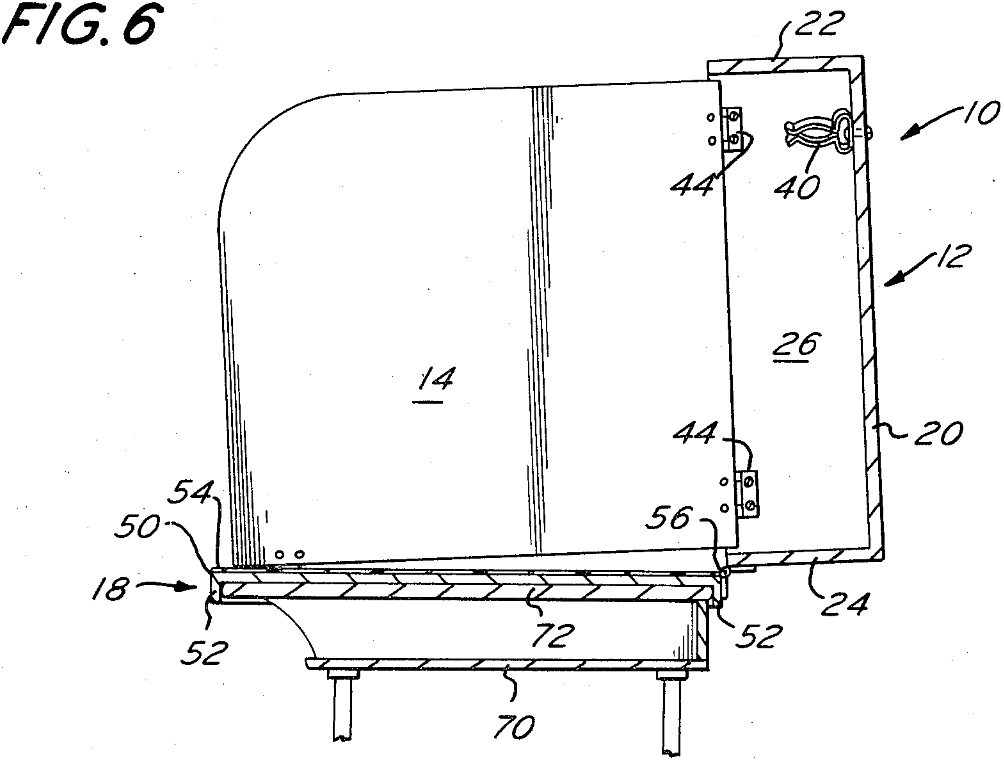
FIG. 7
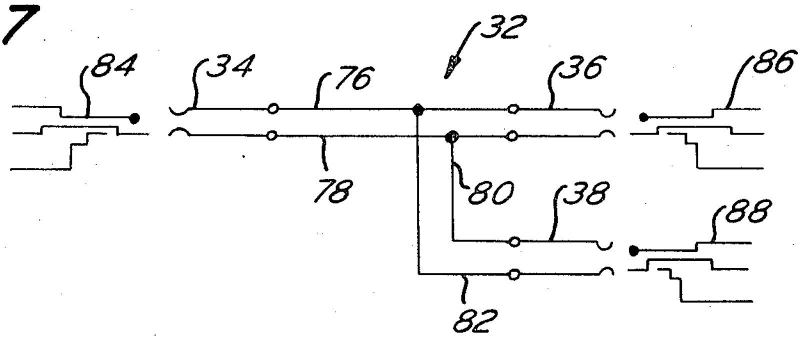
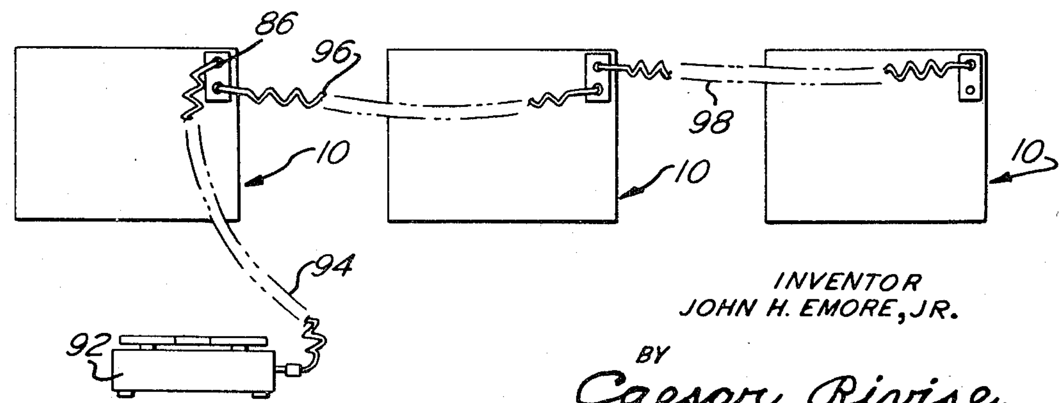
FIG. 8
INVENTOR
JOHN H. EMORE, JR.
BY
Caesar, Rivise, Bernstein & Cohen
ATTORNEYS.

United States Patent Office 3,562,929

Patented Feb. 16, 1971

3,562,929

ISOLATION BOOTH

John H. Emore, Jr., 101 Church St., Ambler, Pa. 19002

Filed July 25, 1968, Ser. No. 747,641
Int. Cl. A47b *41/00*
U.S. Cl. 35—60 3 Claims

ABSTRACT OF THE DISCLOSURE

An isolation booth usable in the teaching arts comprising a rear section and a pair of side panels pivotable into the rear section for storage. A desk panel is pivotable up against the rear section. The desk panel and side partitions are pivotable outwardly and secured in place to form a carrell or isolation booth. The entire structure is portable.

This invention relates to an isolation booth, and more particularly, to a portable student teaching station.

It is now a present practice to have teaching or language laboratory equipment in specialized classrooms whereby each student is isolated from the other students through the use of an isolation booth, which is referred to as a carrell. Substantially all of the carrells now in use comprise a table or desk having a work surface and upstanding partitions along their sides and usually at their rear margins, so that each student is provided with the privacy of an isolated work area. This, in turn, is provided with the usual electronic or electrical equipment for visual or audio instruction, recording, playback, communication and the like. To this end, many of the isolation booths are provided with earphones for receiving instructions and microphones for recording answers by the students. Additionally, other electronic media, such as tape recorded instructions, are used in conjunction with the isolation booths.

The isolation booths currently in use have now taken on widespread functions. They are used for teaching foreign languages, shorthand dictation practice, and speech. They have also been used to provide special instructions to students who are slow at learning, or students who, because of some physical or mental defect, require individualized instruction. Utilizing the isolation booths now in use it is possible to instruct a large number of students, such as eight or more, at a single time, with each student having complete privacy for his work.

One of the problems of all of the carrells or isolation booths now in use is that they are permanent structures and are not portable. One of the earliest types of carrells comprised a large table having longitudinally and transversely extending partitions formed thereon. Thus, six or eight isolation booths could be formed on a single table. The problem with this is that the table had a single purpose, and could only be used as a group of carrells.

An improvement in this type of carrell was made by providing fold down partitions or by providing partitions which could pass through slots formed in the table top. In this way the table could also serve its normal function as a table.

Other improvements in carrells included the use of fold down partitions on student desks. However, the addition of the partitions to the desk elevated the desk surface substantially, and detracted substantially from the attractiveness of the desk.

Another improvement in carrells comprises the provision of a tubular steel frame and insert panels to form the partitions of the carrell. This carrell did constitute an improvement over the prior carrels in that it could be disassembled and reassembled in another location, and therefore did not have the permanence of location of the prior carrells. However, even with this structure, substantial amounts of time are required to disassemble the carrell and reassemble it in another location. For this reason, for most practical purposes, the carrell would have to remain in the location where it was originally assembled.

Even with all of the modern improvements in carrells, they all have one major shortcoming in that they are not portable. Thus, once they were set up in a given room, they had to remain in that room, and therefore the room could only be used, as a practical matter, for instruction with isolation booths. When a given set of students wanted to use the isolation booths, they had to go from the classroom where they received their normal class instruction to the specially constructed classroom containing the carrells. In rooms that had the desks that were convertible to carrels, the use of the carrells was limited to the specific students using the room. Thus, from the standpoint of cost, only a limited number of students could use the carrell, unless the students changed classes, thereby resulting in the same disadvantages as the permanently constructed carrells.

The device of this invention overcomes all of the problems of the prior art carrells with respect to portability. Thus, this isolation booth is easily folded into a compact carrying condition in less than a minute, and is easily carried from classroom to classroom or from school to school. In this way a school system can provide isolation booth type instruction to a large number of students within the school district at minimum cost. Furthermore, the cost of the isolation booth of this invention is far less than the cost of any other isolation booth currently in use.

It is therefore an object of this invention to provide a novel isolation booth.

It is another object of this invention to provide an isolation booth that is portable and is easily assembled and disassembled.

These and other objects of this invention are accomplished by providing an isolation booth comprising a rear section forming a back wall and having a pair of side walls projecting therefrom, a pair of side panels pivotally secured to said side walls, and a desk panel pivotally secured to said rear section, whereby said side panels may be pivoted from a closed position substantially parallel to said rear panel to an open position substantially perpendicular to said rear panel and said desk panel may be pivoted from a closed position substantially parallel to said rear panel to an open position substantially perpendicular to said rear panel.

Other objects and many of the attendant advantages of this invention will be readily appreciated as the same becomes better understood by reference to the following detailed description when considered in connection with the accompanying drawings wherein:

FIG. 1 is a perspective view of the isolation booth of this invention in its collapsed condition;

FIG. 2 is a perspective view of the isolation booth of FIG. 1, but showing the position in its first step of assembly for use;

FIG. 3 is a perspective view of the isolation booth of this invention showing the second step of its assembly for use;

FIG. 4 is a perspective view of the isolation booth of this invention in its fully assembled condition;

FIG. 6 is a sectional view taken along the line 6—6 of FIG. 5, and showing the isolation booth of this invention when mounted on a desk top;

FIG. 7 is a wiring diagram of the jack box used in the isolation booth of this invention; and FIG. 8 is a diagrammatic view showing three isolation booths of this invention when wired in series with a tape player.

Figure 5:
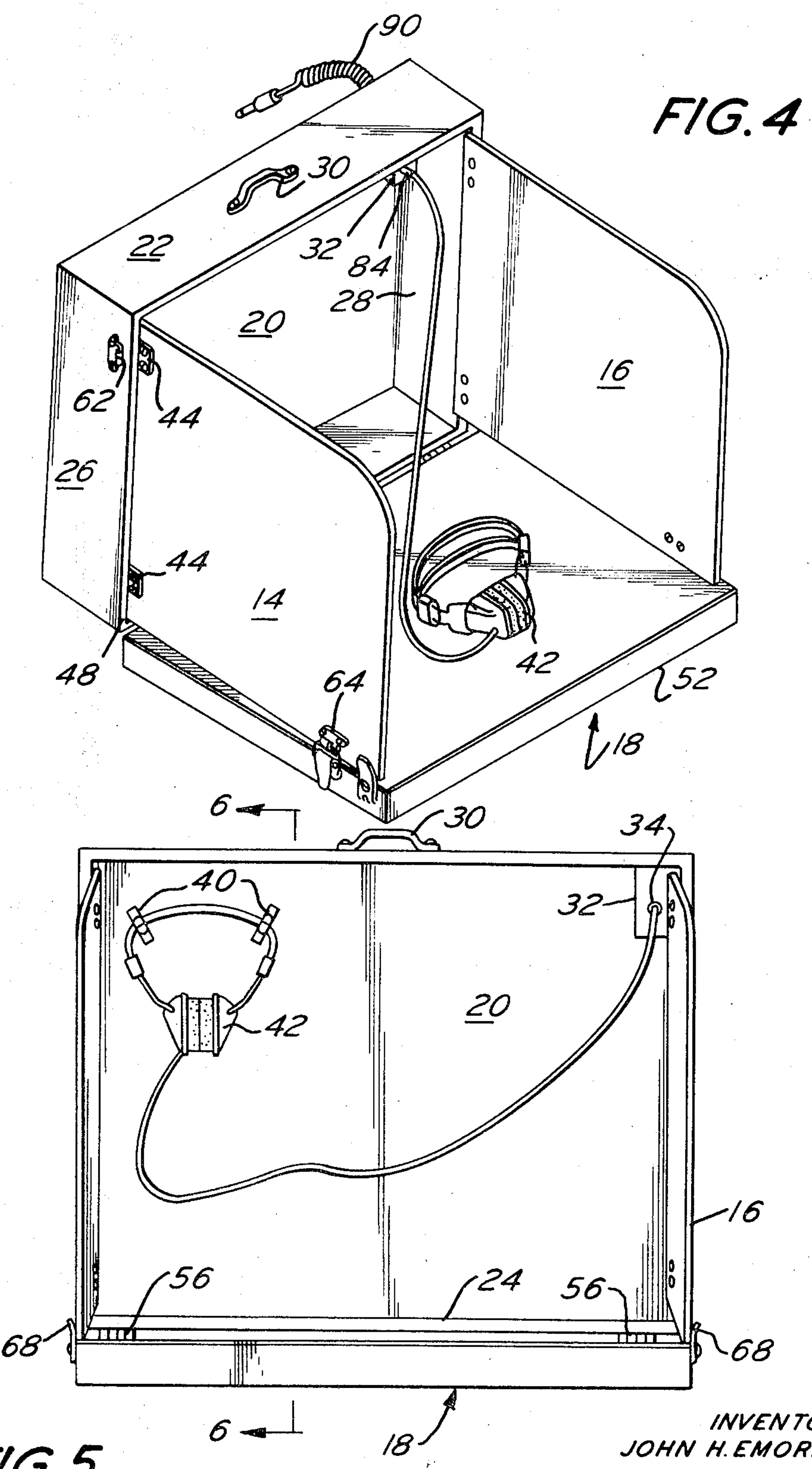
FIG. 5 is a front elevational view of the isolation booth of this invention in its assembled condition.

Referring now in greater detail to the various figures of the drawings wherein similar reference characters refer to similar parts, an isolation booth embodying the present invention is generally shown at 10 in FIG. 1. Device 10 basically comprises a rear section 12, side panels 14 and 16, and a desk panel 18.

Rear section 12 comprises rear wall 20, top wall 22, bottom wall 24, and side walls 26 and 28. A carrying handle 30 is mounted on the top of top wall 22. An electrical jack box 32 is mounted on the interior face of back panel 20. Jack box 32 includes a socket 34 in its front face and sockets 36 and 38 in its rear face (FIG. 2). Sockets 36 and 38 are accessible through the back of rear wall 20, as seen in FIG. 2.

Back of rear wall 20 also has mounted on the front face thereof a pair of spring clips 40 (FIGS. 5 and 6). The purpose of clips 40 is to hold a set of earphones 42. Side panel 14 is pivotally secured to the inside face of side wall 26 by hinges 44. Side panel 16 is pivotally secured to the inside face of side wall 28 by hinges 46. As best seen in FIG. 3, hinges 44 and 46 are located inwardly of the forward edges 48 of side walls 26 and 28. The purpose of this positioning is to permit the side panels 14 and 16 to pivot inwardly and be completely within the confines of rear section 12, thereby aiding in the collapsing and storage of the isolation booth of this invention, as will be explained hereinafter in further detail.

As best seen in FIG. 6, desk panel 18 includes a flat board 50 having a downward lip 52 around the entire perimeter thereof. The surface of board 50 has laminated thereto a durable plastic sheet 54, such as Formica. Desk panel 18 is secured to bottom wall 24 of rear section 12 by hinges 56.

A pair of latches 58 having wire bails 60 is secured to desk panel 18 near the front edge thereof. A U-shaped bracket 62 is secured on side wall 26, and a similar bracket is secured on side wall 28. A U-shaped bracket 64 is secured on side panel 14 and a U-shaped bracket 66 is secured on side panel 16 (FIG. 3). A pair of tabs 68 is secured on desk panel 18 adjacent the front edge thereof. As seen in FIG. 3, tabs 68 have upwardly projecting ends that are flared outwardly.

The isolation booth of this invention is in a portable condition when collapsed, as shown in FIG. 1. Side panels 14 and 16 are folded into the rear section 12 and desk section 18 is folded upwardly around hinges 56 to abut the forward edge 48 of side walls 26 and 28. The desk panel is locked in the position shown in FIG. 1 by the engagement of bails 60 of latches 58 in brackets 62 on walls 26 and 28. With the isolation booth in the collapsed condition it is easily carried from room to room or from school to school.

When it is desired to set the device 10 up for use as an isolation booth, it is first placed horizontally, as shown in FIG. 2. The device can be placed on any flat surface, such as a table, or can be placed over a desk 70, as seen in FIG. 6. Thus, as seen in FIG. 6, lip 52 projects over the edges of desk top 72. This holds device 10 securely in place and prevents its being inadvertently pushed off the desk.

Thereafter, latches 58 are released, and rear section 12 is pivoted upwardly to the position shown in FIG. 3. Side panel 16 is then swung outwardly around hinges 46, in the direction of arrow 74. The swinging is continued until side panel 16 abuts tab 68 (FIG. 5). In a similar manner, side panel 14 is swung outwardly until it abuts its associated tab 68. Thereafter, the side panels 14 and 16 are secured in place by the engagement of bails 60 of latches 58 in brackets 64 and 66.

After the latches have been engaged in brackets 64 and 66, the isolation booth will be in an open condition and ready for use. As seen in FIG. 6, when device 10 is completely open, back section 12 is inclined slightly toward the desk panel 18. The purpose for this is to have the center of gravity of the back section positioned over desk panel 18 in order to prevent the inadvertent tipping of the device rearwardly. If desired, brackets can be secured on device 10 to anchor it to the desk 72 or any other supporting structure holding it.

The isolation booth of this invention can be used as a dry carrell or a wet carrell. As a dry carrell, its use is solely for providing isolation for the student using it. As a wet carrell, other media such as a microphone or tape player are connected with the carrell. Jack box 32 is used for converting isolation booth 10 into a wet carrell. A wiring diagram for the jack box is shown in FIG. 7. As seen therein, sockets 34, 36 and 38 are connected in parallel by leads 76, 78, 80 and 82. The sockets 34, 36 and 38 are used with conventional plugs 84, 86 and 88.

When used as a wet carrell, earphones 42 are connected to the jack box 32 by inserting plug 84 in socket 34. A plug 86 secured to wire 90 (FIG. 4) is inserted in jack 36. Wire 90 has a second plug secured on the other end for attachment to a tape player, record player, or microphone. In this way, instructions can be given to the student using isolation booth 10 through the earphones 42.

In most instances, the isolation booths of this invention will be used in a series or group. Thus, as seen in FIG. 8, three isolation booths 10 are shown schematically as being interconnected. A tape player 92 is connected to an isolation booth 10 by wire 94. Wire 94 has one end thereof connected to a plug 86 which is received in socket 36. A second wire 96 connects socket 38 of one isolation booth with socket 38 of a second isolation booth 10. A wire 98 connects socket 36 of the second isolation booth with socket 36 of a third isolation booth. In this manner, any number of isolation booths can be connected together through the use of the series of wires secured in the jack boxes of each booth. The only limit to the number of booths which may be interconnected is the amount of impedance which results when too large a number has been interconnected. However, it has been found that excellent results are obtained when interconnecting six isolation booths in the manner shown in FIG. 8, and it is believed that substantially more isolation booths can be added without greatly adversely affecting the quality of the sound coming from the tape player.

With the isolation booths arranged in the series shown in FIG. 8, instructional material can be placed on a tape and transmitted to the students using the isolation booths from the tape player through the wires into all of the booths. The student at each booth will receive the material through the use of the earphones 42. When the earphones are not in use, they can be placed on the spring clamps 40, as shown in FIG. 5. If desired, additional jacks can be furnished for the isolation booth to permit the student to respond to instructions received by the earphones by giving answers through a microphone, which answers can be tape recorded.

One of the features of the isolation booth of this invention is its extremely light weight. The entire booth can be constructed from plywood. If desired, acoustical panels can be laminated to the interior surfaces of the plywood. Additionally, if it should become necessary for a student to be able to see through the rear wall 20, a sheet of glass or transparent plastic can be inserted in the rear panel. Because of the lightness of the isolation booths, they can easily be arranged in any set pattern within a classroom. Thus, they can be set up in a circular pattern or can be aligned in a row. When a glass panel insert is used, they can all be aligned facing a visual demonstration or a motion picture or slides used in connection with the instructions being given.

After the device has been used, it is easily collapsed and secured in the condition shown in FIG. 1. The flared ends of tabs 68 facilitate the pivoting of desk panel 18 against rear section 12 by permitting the tabs to bypass side walls 26 and 28. While in the collapsed condition it is easily transported from room to room or from school to school. The total set up time for an individual isolation booth is less than one minute.

When in the collapsed condition, side panels 14 and 16 are entirely within the confines of rear section 12. This is accomplished by having hinges 44 and 46 mounted inwardly of the forward edges 48. Thus, when desk panel 18 is pivoted upwardly, it will fit flush with edges 48. This facilitates the locking of the desk panel in place for the storage or transporting of the isolation booth.

Without further elaboration, the foregoing will so fully illustrate my invention, that others may, by applying current or future knowledge, adopt the same for use under various conditions of service.

What is claimed as the invention is:

1. An isolation booth comprising a rear section forming a back wall and having a pair of side walls projecting from said back wall, said back wall additionally having a top wall and a bottom wall projecting therefrom, said top and bottom walls and said side walls having forward edges which lie in the same plane, a desk panel pivotally secured to said bottom wall, a pair of side panels pivotally secured to said side walls by hinges, said hinges being located inwardly of the front edges of said side walls, said side panels being pivotable from a closed position substantially parallel to said back wall to an open position substantially perpendicular to said back wall, said side panels being wholly inward of said side walls when pivoted to a position substantially parallel to said back wall, said desk panel being pivotable from a closed position substantially parallel to said back wall to an open position substantially perpendicular to said back wall, said edges of said side walls, top wall and bottom wall abutting said desk panel when said desk panel is in said closed position, means for releasably securing said side walls in said open position, means for releasably securing said desk panel to said rear section when said desk panel is in said closed position, and means for mounting said desk panel on a desk, said mounting means comprising a downwardly projecting lip on the bottom of said desk panel that extends around the entire perimeter of said desk panel.

2. The isolation booth of claim 1 wherein said rear wall and said side panels lie in substantially vertical planes when said side panels are in an open position and said desk panel lies in a substantially horizontal plane when in said open position.

3. The isolation booth of claim 1 and further including means for connecting electrical teaching aids.

References Cited

UNITED STATES PATENTS

| | | | |
|---|---|---|---|
| 1,813,793 | 7/1931 | Bullock | 312—258X |
| 1,839,783 | 1/1932 | Bloom | 190—11 |
| 2,872,753 | 2/1959 | Fenton | 35—53X |
| 3,073,057 | 1/1963 | Farber | 312—244X |
| 3,110,375 | 11/1963 | Uggerby | 312—262X |
| 3,128,344 | 4/1964 | Goold | 35—35X |
| 3,315,375 | 4/1967 | Heinz | 35—60X |

FOREIGN PATENTS

| | | | |
|---|---|---|---|
| 1,027,628 | 2/1953 | France | 190—12 |
| 349,380 | 5/1931 | Great Britain | 190—11 |
| 165,468 | 2/1934 | Switzerland | 312—241 |

OTHER REFERENCES

Oravisual Company, Inc. of St. Petersburg, Fla. Catalog No. 9, received October 1965, p. 29 only.

Audiovisual Instruction, vol. 6, No. 5, May 1961, p. 211 only.

HARLAND S. SKOGQUIST, Primary Examiner

U.S. Cl. X.R.

312—262